United States Patent [19]

Cameron

[11] Patent Number: 5,131,030

[45] Date of Patent: Jul. 14, 1992

[54] LIGHT CONTROLLED TELEPHONE RINGER

[76] Inventor: R. James Cameron, 584 Campbell Street, Winnipeg, Manitoba, Canada, R3N 1C1

[21] Appl. No.: 731,613

[22] Filed: Jul. 17, 1991

[51] Int. Cl.⁵ ............................................. H04M 1/72
[52] U.S. Cl. .................................. 379/373; 379/199; 379/375
[58] Field of Search ............... 379/188, 199, 372, 373, 379/375, 376, 396

[56] References Cited

U.S. PATENT DOCUMENTS

| | | | |
|---|---|---|---|
| 4,031,332 | 6/1977 | Shylo | 379/373 |
| 4,459,435 | 7/1984 | Foldvary et al. | 379/199 |
| 4,529,845 | 7/1985 | Boeckmann | 379/376 |

OTHER PUBLICATIONS

Victoria Di Zerega, "An Automatic Phone Disconnector" Modern Electronics, Feb. 1986, pp. 37, 104.

Primary Examiner—James L. Dwyer
Assistant Examiner—Harry S. Hong
Attorney, Agent, or Firm—Robert W. B. Bailey

[57] ABSTRACT

A telephone ringer is light controlled, when the light intensity is below an adjustable preset level the ringer does not ring. The control element includes a SCR switching element, the gate potential of which is controlled by a light dependent resistance. A manual switch element to allow the telephone to be set ON, OFF, or AUTOMATIC is included. The AUTOMATIC setting is the light control element. The control element may be in the telephone set, or in a module insertable between set and system. The module additionally includes circuitry to allow phoning out. Courtesy and indicator light circuits are provided to allow dialing in the dark and incoming calls.

9 Claims, 3 Drawing Sheets

LIGHT CONTROLLED TELEPHONE RINGER

This invention relates to light controlled telephone ringers. In particular it relates to circuitry incorporating a light sensitive component allowing the telephone to ring at a predetermined light intensity, but not at lower light intensities.

Although the invention will be described and referred to specifically as it relates to light controlled telephone circuits incorporating light sensitive photocells, it will be understood that the principles of this invention are equally applicable to similar devices and accordingly, it will be understood that the invention is not limited to such light controlled telephone circuits.

DESCRIPTION OF PRIOR ART AND BACKGROUND

Applicant is not aware of any related prior art.

Telephone circuits essentially consist of a ringer circuit and the associated handset circuit. The ringer circuit alerts the user to an incoming call, who then picks up the handset, shutting off the ringer and closing the handset circuits.

Many people do not wish to be to be awakened by a telephone ringing. The usual solutions of disconnecting the telephone or disabling its ringer are inconvenient, because the telephone tends to be left in this state, and incoming calls are not received, and to be effective these acts must be carried out nightly.

It is an object of the invention to provide a light controlled telephone circuit which enables the ringer circuit at a predetermined light intensity, disabling the ringer circuit at lesser light intensities. Other objects will be apparent to those skilled in the art from the following specification, appended claims and accompanying drawings.

DESCRIPTION OF THE INVENTION

In one broad aspect the invention is directed to an improved telephone set having a ringer, by providing rectifier means in series with the ringer. The rectifier means converts AC input to DC output and has anode means and cathode means. SCR (silicon controlled rectifier) means connected in series with said rectifier means, has anode means, cathode means and gate means. The SCR anode means is connected to said rectifier cathode means. The SCR cathode means is connected to the rectifier anode means. Light dependent resistance means connects in series with the gate means and the rectifier cathode means, the light dependent resistance means having a higher resistance in the absence of light and a lower resistance in the presence of sufficient light. The presence of sufficient light causes the SCR gate means to have positive potential changing the SCR from a nonconductive to a conductive state, whereby incoming AC input actuates the ringer, so the ringer is light controlled. Preferably there is first resistance means in series between the light dependent resistance means and the rectifier cathode means. Preferably there is second resistance means adjustable from zero to finite resistance in series with the SCR gate means and the rectifier anode means. Desirably switching means is provided in series with the first resistance means and the rectifier cathode means and in parallel with the SCR means. Preferably the switching means has first and second positions, the first position connecting the rectifier cathode means to the first resistance means, and the second position connecting the rectifier cathode means to the rectifier anode means. The switching means may have a third position, the third position being open. MOV (metal oxide varistor) means may be provided in parallel with the rectifier means and in series with the ringer means.

In another broad aspect the invention is directed to a module system for insertion between a telephone system and a telephone set, which includes a ringer. The module system has first and second conductor means to connect the telephone set to the telephone system. The first conductor means has rectifier means for converting AC input to DC output, the rectifier means has anode means and cathode means. SCR (silicon controlled rectifier) means connected in series with the rectifier means, has anode means, cathode means and gate means. The SCR anode means is connected to the rectifier cathode means. The SCR cathode means is connected to the rectifier anode means. Light dependent resistance means is provided in series with the gate means and the rectifier cathode means. The light dependent resistance means has a higher resistance in the absence of light and a lower resistance in the presence of sufficient light. MOV (metal oxide varistor) means preferably is in parallel with the rectifier means in the first conductor.

When the module system is inserted between the telephone system and the telephone set, the presence of the sufficient light causes the SCR gate means to have positive potential changing the SCR means from a nonconductive to a conductive state, so incoming AC input actuates the ringer.

Switching transistor means is provided in series with the rectifier anode means and the rectifier cathode means. This switching transistor means has collector means, base means and emitter means. The collector means is connected to the rectifier cathode means, while the emitter means being connected to the rectifier anode means. Voltage divider means is provided in series with the rectifier anode means and rectifier cathode means, and in parallel with the switching transistor means, the voltage divider means is connected to the base means. The collector means is in series with the SCR gate means. Electrolytic polarized condenser means having positive and negative terminals, is connected in parallel with the switching transistor means. The positive terminal is connected to the collector means, the negative terminal is connected to the rectifier anode means. Preferably the rectifier means is diode bridge means.

When the module system is inserted between the telephone system and the telephone set, the voltage divider means provides sufficient positive potential to the base means to switch the transistor means to a conductive state during incoming calls. This prevents the electrolytic polarized condenser means charging and discharging, causing the SCR gate means to remain neutral, and the SCR means to remain in a nonconductive state. The voltage divider means provides insufficient positive potential to the base means to switch the transistor means to a conductive state during outgoing calls allowing the electrolytic polarized condenser means to charge and discharge, causing the SCR gate means to have positive potential changing the SCR means from a nonconductive to a conductive state, so outgoing calls can be made. Preferably first resistance means is in series between the light dependent resistance means and the rectifier cathode means. Preferably second resistance means adjustable from zero to finite resistance is in series with the SCR gate means and the rectifier anode means. Optionally third resistance means is in series between the collector means and the rectifier cathode means. Optionally fourth resistance means and first current rectifier means is in series between the collector means and the SCR gate means, the first current rectifier means having anode means and cathode means, the first current rectifier cathode means being connected to the SCR gate means. Optionally second current rectifier means is in series between the light dependent resistance means and the SCR gate means, the second current rectifier has anode means and cathode means. The second current rectifier cathode means is connected to the SCR gate means. Courtesy light circuit means may be provided in series between the rectifier cathode means and the SCR anode means, the courtesy light circuit means comprising in parallel courtesy light means, and zener diode means, which has anode means and cathode means. The zener diode cathode means is connected to the rectifier anode means, the zener diode anode means is connected to the SCR anode means. Indicator circuit means may be provided connecting the first and second conductors. The indicator circuit means is connected on the telephone system side of the MOV means, comprising in series fifth resistance means, neon tube means, and capacitor means. Desirably switching means is provided in series with the first resistance means and the rectifier cathode means and in parallel with the SCR means. Preferably the switching means has first and second positions, the first position connects the rectifier cathode means to the first resistance means, and the second position connects the rectifier cathode means to the rectifier anode means. The switching means may have a third position, the third position being open.

In a third broad aspect the invention is directed to an improved telephone circuit including a ringer. The improvement provides rectifier means in series with the ringer, converting AC input to DC output and having anode means and cathode means. SCR (silicon controlled rectifier) means in series with the rectifier means, has anode means, cathode means and gate means. The SCR anode means is connected to the rectifier cathode means. The SCR cathode means is connected to the rectifier anode means. Light dependent resistance means is connected in series with the gate means and the rectifier cathode means. The light dependent resistance means has a higher resistance in the absence of light and a lower resistance in the presence of sufficient light. The presence of sufficient light causes the SCR gate means to have positive potential changing the SCR means from a nonconductive to a conductive state, so incoming AC input actuates the ringer, whereby the ringer is light controlled. Preferably first resistance means is in series between the light dependent resistance means and the rectifier cathode means. Preferably second resistance means adjustable from zero to finite resistance is in series with the SCR gate means and the rectifier anode means. Desirably switching means is provided in series with the first resistance means and the rectifier cathode means and in parallel with the SCR means. Preferably the switching means has first and second positions, the first position connecting the rectifier cathode means to the first resistance means, and the second position connecting the rectifier cathode means to the rectifier anode means. The switching means may have a third position, the third position being open.

Preferably MOV (metal oxide varistor) means is in parallel with the rectifier means and in series with the ringer. Preferably the rectifier means is diode bridge means.

BRIEF DESCRIPTION OF THE DRAWINGS

Preferred embodiments are indicated in the drawings where.

DESCRIPTION OF THE PREFERRED EMBODIMENTS

Figure 1:
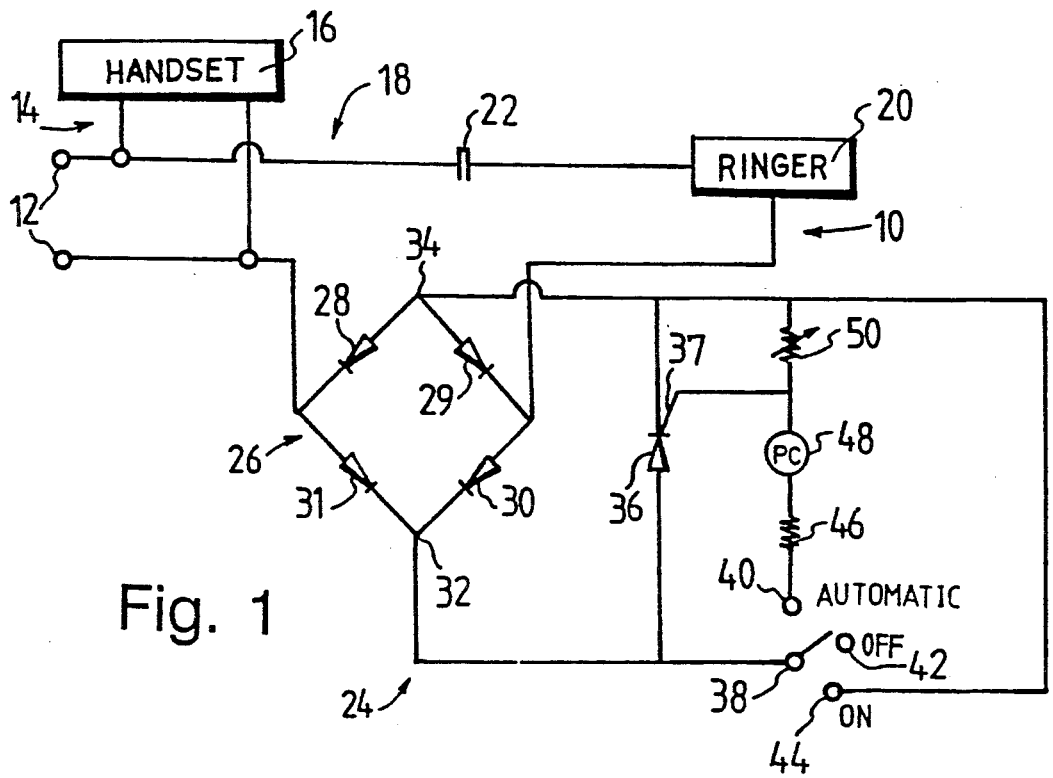
FIG. 1 shows a schematic diagram of an embodiment of the invention as attached to a ringer circuit.

The general description of the invention is now expanded by reference to the drawings, which illustrate preferred embodiments of the invention.

Telephone circuit 10 is connected to the telephone system by telephone set terminals 12 often via a plug into a jack. Circuit 10 includes handset circuit 14 including handset 16 in parallel with ringer circuit 18 including ringer 20 in series with typically 0.5 UF capacitor 22. Ringer 20 may be an electromagnetic vibrator, or a piezoelectric transducer of the SONALERT type, and is activated by application of AC voltage typically 90 volts at 20 cycles. In series with ringer 20 and capacitor 22 is modified circuit 24, beginning with diode bridge 26 of diodes 28, 29, 30 and 31, suitably 1N 4007 or equivalent diodes as known by those skilled in the art. Connected across the diode bridge 26 between cathode 82 and anode 84 is silicon controlled rectifier (SCR) 36, NTE 5405 or equivalent. Triacs were tested but found not to work. In parallel with rectifier 36 is three way switch 38, which has three terminals 40, 42, and 44. Terminal 40 is connected in series to 47K resistance 46, through which current flows to photocell 48, a cadmium sulfide light dependent resistance, typically RS (Radio Shack) 276-116 or equivalent, which is connected to gate 37 of SCR 36. Because these photocells are very variable in performance, sensitivity potentiometer 50 is connected across SCR 36 from gate 37 to its cathode. Potentiometer 50 is a 5K resistance adjustable from 0 to 5K by screw adjust or attached knob, through 1 turn. The upper limit is not critical as long as it can be adjusted down to 0. Terminal 42 is not connected and opens the circuit. Terminal 44 is connected directly to anode 34 of diode bridge 26.

Normally gate 37 of SCR 36 is neutral with respect to its cathode, and the SCR acts as an open switch. When there is sufficient light photocell 48 acts as a closed switch rather than as an open switch. If light is insufficient and switch 38 is set to terminal 40, when the ringer activating AC voltage arrives cathode 32 of bridge 26 becomes positive, but photocell 48 does not allow current to pass, the gate of SCR 36 remains neutral and SCR 36 acts as an open switch. The AC voltage cannot ring the ringer. When there is sufficient light and switch 38 is set to terminal 40, photocell 48 acts as a closed switch, and sufficient current flows through it. This biases the gate of SCR 36 positive, turning it into a closed switch allowing current to flow to the ringer and ring it. Adjustment of sensitivity potentiometer 50 enables setting of the light level required to close SCR 36. When switch 38 is set to terminal 42, no current can flow under any conditions, the ringer is off. When switch 38 is set to terminal 44, current can always flow, and the ringer is on. A manual switch control can be mounted on the exterior of the telephone set marked AUTOMATIC (terminal 40), OFF (terminal 42), ON (terminal 44).

Figure 2:
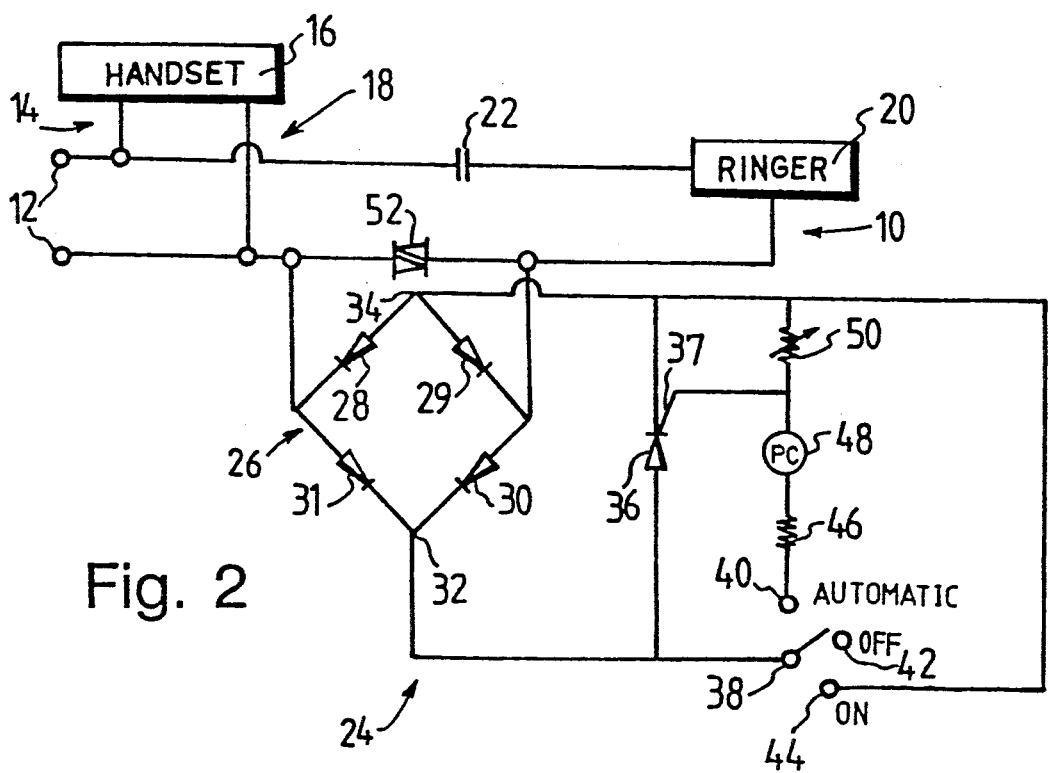
FIG. 2 shows a schematic diagram of a variant of the embodiment of FIG. 1.
Figure 3:
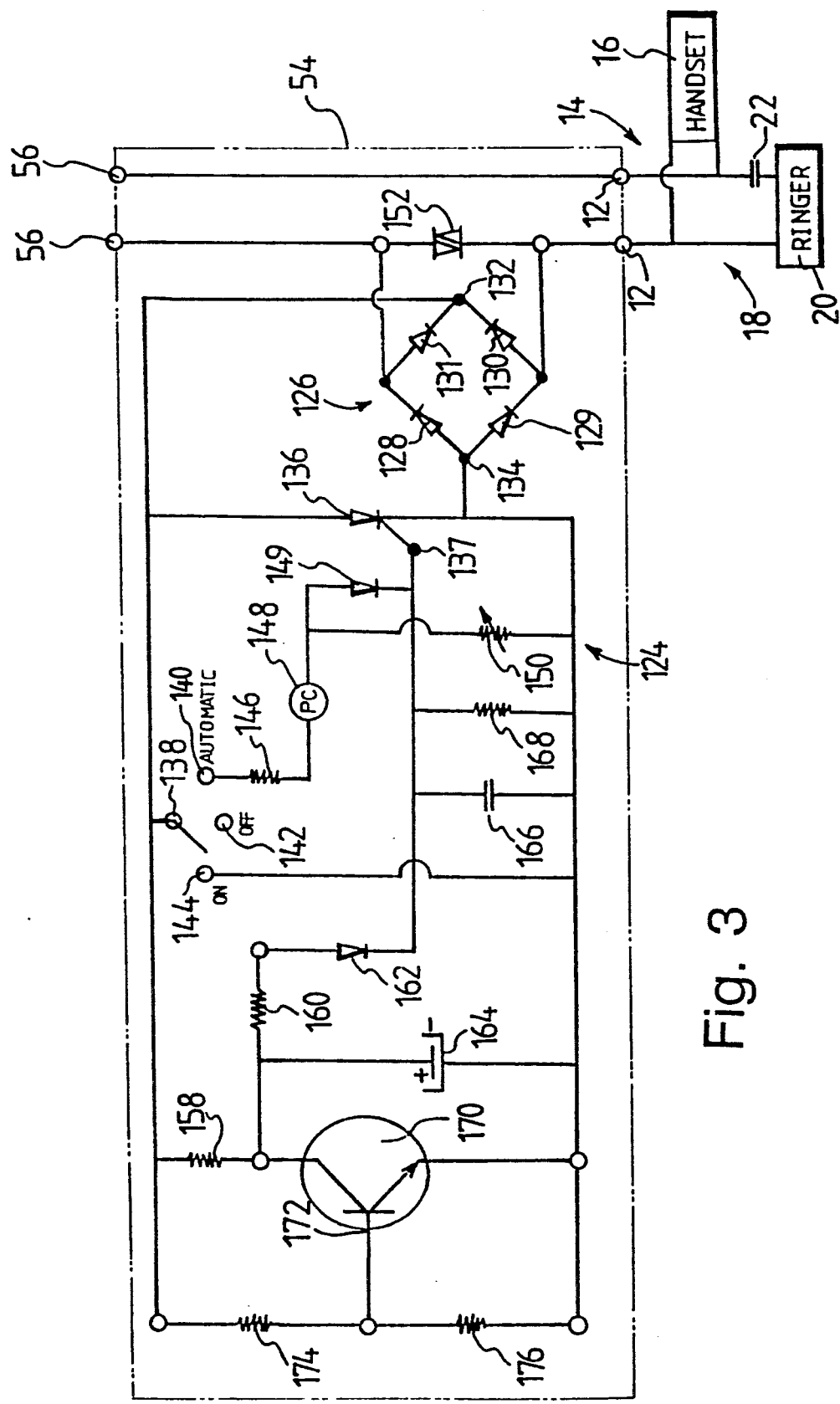
FIG. 3 shows a schematic diagram of an alternative embodiment of the invention as attached to a telephone line.

FIG. 2 is identical to FIG. 1, except it incorporates optional metal oxide varistor 52, 130LA20 GE or equivalent, which is connected in parallel across the AC side of diode bridge 26. This preferred feature protects all components against common line spikes.

FIG. 8 shows module 54, connected between telephone set terminals 12 and telephone system terminals 56. Typically telephone set terminals 12 are a plug received by a jack in module 54, while typically telephone system terminals 56 are a jack receiving a plug from module 54. One line of module 54 has metal oxide varistor 152, 130LA20 GE or equivalent, in series between terminals 12 and 56. In parallel with varistor 152 is modified circuit 124, beginning with diode bridge 126 of diodes 128, 129, 130 and 131, suitably 1N 4007 or equivalent diodes as known by those skilled in the art. Connected across the diode bridge 126 between cathode 132 and anode 184 is silicon controlled rectifier (SCR) 136. NTE 5405 or equivalent. Triacs were tested but found not to work. In parallel with rectifier 136 is three way switch 138, which has three terminals 140, 142, and 144. Terminal 140 is connected in series through 47K resistance 146 to photocell 148, a cadmium sulfide light dependent resistance, typically RS (Radio Shack) 276-116 or equivalent, which is connected in series with diode 149, 1N 914B or equivalent to gate 137 of SCR 136, Because these photocells are very variable in performance, sensitivity potentiometer 150 is connected across SCR 36 from gate to cathode. Potentiometer 150 is a 5K resistance adjustable from 0 to 5K by screw adjust or attached knob, through 1 turn. The upper limit is not critical as long as it can be adjusted down to 0. Terminal 142 is not connected and opens the circuit. Terminal 144 is connected directly to anode 134 of diode bridge 126.

Thus far the circuitry is nearly identical to that of FIGS. 1 and 2, and functions virtually identically. The difference is that in FIGS. 1 and 2, when the switch 38 is connected to switch terminal 142, (set at OFF), the handset is not switched off, and may be picked up and used. If the same circuitry alone were used in module 54, then the handset cannot be used as it also is cut off. To allow the handset to function when picked up there must be a voltage present at the handset but no current, typically this voltage is 48 volts DC. In parallel with switch 38 is connected 100K resistor 158, which itself is connected in series with 100K resistor 160 and diode 162 to gate 137 of rectifier 136. From the junction of resistors 158 and 160 polarized capacitor 164 is connected to anode 134 of diode bridge 126. When the switch 138 is set at OFF, or AUTOMATIC in the dark, this arrangement permits a trickle current to pass through to handset 16. On lifting handset 16, 48 volts DC are created across MOV 152 by the exchange or equivalent, which via resistors 158 and 160, and diode 162 creates a positive potential at gate 137, switching on SCR 136, allowing outgoing calls. During dialing out which temporarily switches off the potential at MOV 152, as each number is dialed, resistor 160 and polarised capacitor 164 maintain the potential at gate 137, holding SCR 136 conducting during dialing. Otherwise gate 137 would go neutral, disconnecting the handset from line each time a number was dialed. This system while permitting out going calls would also permit incoming calls, which typically apply 90 volts 20 cycle AC on top of 48 volts DC, which converts to a diode bridge DC output of about 175 volts, which will trigger SCR 136. This circuitry also incorporates a stabilizing network consisting of 0.01 UF capacitor 166, and 100K resistor 168, connected in parallel between gate 7 of SCR 136 and its cathode, this prevents a spike voltage on the anode of SCR 136 from accidentally triggering SCR 136.

To prevent this while allowing dialing out during the OFF position, or AUTOMATIC in the dark, further circuitry is present, which consists of NPN silicon transistor 170, 2N 3904 or equivalent, in parallel with capacitor 164, base 172 is connected in series with 1 megohm resistor 174 to cathode 132 of diode bridge 126, and in series with 10K resistor 176 to anode 134 of diode bridge 126. The transistor is switched to conduct adequately by an applied gate voltage of 0.5 to 0.7 volts, below this it does not. The potential created by resistors 174 and 176 is about 1/100th of that applied by the diode bridge or 0.48 volts at 48 volts DC, or 1.26 volts peak at 90 volts AC, or 1.74 volts peaks at 90 volts AC plus 48 volts DC, thus transistor 170 is cut off when the handset is picked up, but conducts during the higher incoming call voltages. Capacitor 164 remains discharged by the pulse conduction of transistor 170, which means while dialing out is possible at OFF, or AUTOMATIC in the dark, incoming calls do not activate the ringer.

Figure 4:
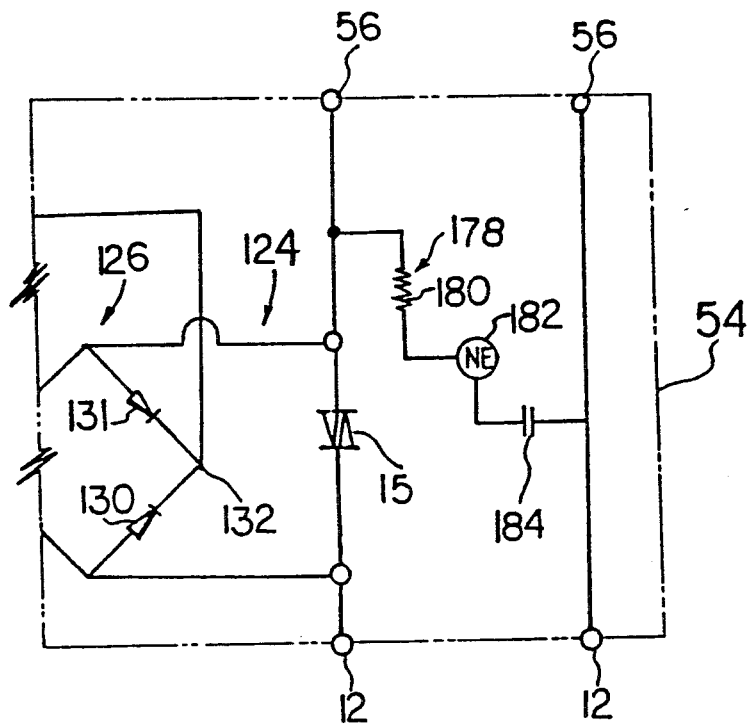
FIG. 4 shows a schematic diagram of an optional detail of the embodiment of FIG. 3.

Optionally as in FIG. 4, subcircuit 178 is connected across the telephone lines on the system side of circuit 124. This includes in series 100K resistor 180, neon lamp 182, NE 2 or equivalent, and 0.01 UF capacitor 184. When incoming call AC voltage is applied across terminals 56, neon light 182 flashes, drawing attention to the telephone in the dark.

Figure 5:
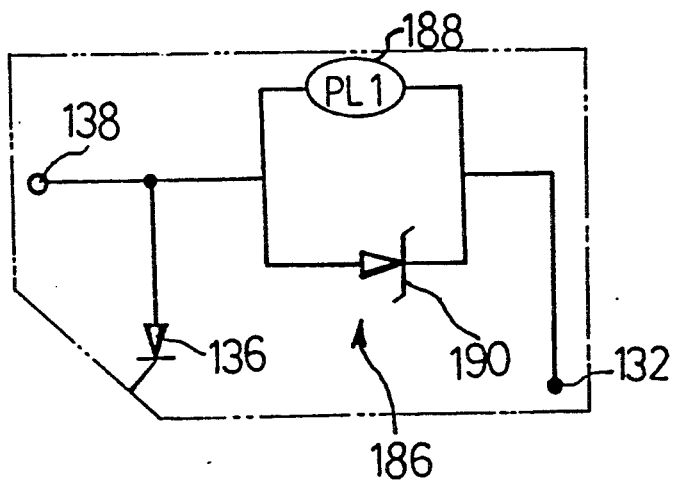
FIG. 5 shows a schematic diagram of an optional detail of the embodiment of FIG. 3.

Optionally as in FIG. 5, subcircuit 186 is present in series between switch 138 and cathode 132 of diode bridge 126. It comprises in parallel pilot light (PL 1) 188, a 10 volt 50 mA lamp, typically 51A, 10ESB, 2107, 8680, 7219, 7051, L1260, 5P-12 or equivalent, and zener diode 190, 1N 4740. This is a courtesy light to allow dialing in the dark.

As those skilled in the art would realize these preferred illustrated dimensions, details and components can be subjected to substantial variation, modification, change, alteration, and substitution without affecting or modifying the function of the illustrated embodiments.

This invention is not limited to the embodiments described above, and it will be apparent to persons skilled in the art that numerous modifications and variations form part of the present invention insofar as they do not depart from the spirit, nature and scope of the claimed and described invention.

I claim:

1. A module system for insertion between a telephone system and a telephone set, said telephone set including a ringer, said module system comprising first and second conductor means to connect said telephone set to said telephone system, said first conductor means comprising rectifier means for converting AC input to DC output and having anode means and cathode means, SCR (silicon controlled rectifier) means in series with said rectifier means, having anode means, cathode means and gate means, said SCR anode means being connected to said rectifier cathode means, said SCR cathode means being connected to said rectifier anode means, light dependent resistance means in series with said gate means and said rectifier cathode means, said light dependent resistance means having a high resistance in the absence of light and a lower resistance in the presence of sufficient light and, switching transistor means in series with said rectifier anode means and said rectifier cathode means, said switching transistor means having collector means, base means and emitter means and, said collector means being connected to said rectifier cathode means, said emitter means being connected to said rectifier anode means, voltage divider means in series with said rectifier anode means and rectifier cathode means, and in parallel with said switching transistor means, said voltage divider means being connected to said base means, said collector means being connected in series with said SCR gate means, and electrolytic polarized condenser means having positive and negative terminals, connected in parallel with said switching transistor means, said positive terminal being connected to said collector means, said negative terminal being connected to said rectifier anode means, when said module system is inserted between said telephone system and said telephone set, the presence of said sufficient light causing said SCR gate means to have positive potential changing said SCR means from a nonconductive to a conductive state, whereby incoming AC input actuates said ringer, said voltage divider means providing sufficient positive potential to said base means to switch said transistor means to a conductive state during incoming calls, preventing said electrolytic polarized condenser means charging and discharging, causing said SCR gate means to remain neutral, and said SCR means to remain in a nonconductive state, said voltage divider means providing insufficient positive potential to said base means to switch said transistor means to a conductive state during outgoing calls allowing said electrolytic polarized condenser means to charge and discharge, causing said SCR gate means to have positive potential changing said SCR means from a nonconductive to a conductive state, whereby outgoing calls can be made.

2. A module system of claim 1, comprising MOV (metal oxide varistor) means in parallel with said rectifier means in said first conductor.

3. A module system of claim 1, comprising first resistance means in series between said light dependent resistance means and said rectifier cathode means, and second resistance means adjustable from zero to finite resistance in series with said SCR gate means and said rectifier anode means.

4. A module system of claim 3, additionally comprising third resistance means in series between said collector means and said rectifier cathode means, fourth resistance means and first current rectifier means in series between said collector means and said SCR gate means, said first current rectifier means having anode means and cathode means, said first current rectifier cathode means being connected to said SCR gate means second current rectifier means in series between said light dependent resistance means and said SCR gate means, said second current rectifier having anode means and cathode means, said second current rectifier cathode means being connected to said SCR gate means.

5. A module system of claim 4, comprising courtesy light circuit means in series between said rectifier cathode means and said SCR anode means, said courtesy light circuit means comprising in parallel courtesy light means, and zener diode means, said zener diode means having anode means and cathode means, said zener diode cathode means being connected to said rectifier anode means, said zener diode anode means being connected to said SCR anode means.

6. A module system of claim 5, comprising MOV (metal oxide varistor) means in parallel with said rectifier means in said first conductor.

7. A module system of claim 6, comprising indicator circuit means connecting said first and second conductors, said indicator circuit means being connected on the telephone system side of said MOV means, said indicator circuit means comprising in series fifth resistance means, neon tube means, and capacitor means.

8. A module system of claim 7, comprising switching means in series with said first resistance means and said rectifier cathode means and in parallel with said SCR means, said switching means having first and second positions, said first position connecting said rectifier cathode means to said first resistance means, said second position connecting said rectifier cathode means to said rectifier anode means.

9. A module system of claim 8, wherein said switching means has a third position, said third position being open.

* * * * *